US006742081B2

(12) United States Patent
Talagala et al.

(10) Patent No.: US 6,742,081 B2
(45) Date of Patent: May 25, 2004

(54) DATA STORAGE ARRAY EMPLOYING BLOCK CHECKSUMS AND DYNAMIC STRIPING

(75) Inventors: Nisha D. Talagala, Fremont, CA (US); Whay S. Lee, Newark, CA (US); Chia Y. Wu, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 450 days.

(21) Appl. No.: 09/846,667

(22) Filed: Apr. 30, 2001

(65) Prior Publication Data

US 2002/0161972 A1 Oct. 31, 2002

(51) Int. Cl.$^7$ .............................................. G06F 12/00
(52) U.S. Cl. ...................... 711/114; 711/113; 711/202; 711/203; 714/6; 714/7
(58) Field of Search ............................... 711/114, 113, 711/202, 203; 714/6, 7

(56) References Cited

U.S. PATENT DOCUMENTS

| 5,124,987 A | | 6/1992 | Milligan et al. | |
| 5,537,534 A | * | 7/1996 | Voigt et al. ..................... | 714/6 |
| 5,758,118 A | * | 5/1998 | Choy et al. .................. | 711/114 |
| 5,819,109 A | * | 10/1998 | Davis ........................... | 710/15 |
| 6,571,310 B1 | * | 5/2003 | Ottesen et al. .................. | 711/5 |

OTHER PUBLICATIONS

Menon, et al., "Floating Parity and Data Disk Array," Journal of Parallel and Distributed Computing 17, pp. 129–139, 1993.

Patterson, et al., "A Case for Redundant Arrays of Inexpensive Disks (RAID)," Proceedings of the International Conference on Management of Data (SIGMOD), Jun. 1988.

Mogi, et al., "Hot Block Clustering for Disk Arrays with Dynamic Striping," Proceedings of the 21$^{st}$ VLDB Conference, Zurich, Switzerland, 1995, pp. 90–99.

Gabber, et al., "Data Logging: A Method for Efficient Data Updates in Constantly Active RAIDs," Proc. of the 14$^{th}$ ICDE, pp. 144–153, Feb. 1998.

* cited by examiner

Primary Examiner—Hong Kim
(74) Attorney, Agent, or Firm—Robert C. Kowert; Meyertons, Hood, Kivlin, Kowert & Goetzel, P.C.

(57) ABSTRACT

A storage system may include a plurality of storage devices each having a plurality of addressable locations for storing data. A storage controller may be coupled to the storage devices and configured to store and retrieve data from the storage devices. An indirection map may be stored within the system having a plurality of map entries each configured to map a virtual address to a physical address on the storage devices. Each map entry may also store a checksum for data stored at the physical address indicated by the map entry. The storage controller may receive storage requests specifying a virtual address and may access the indirection map for each storage request to obtain the corresponding physical address and checksum. Dynamic striping may be employed so that new writes form new parity groups. Thus, stripes of various sizes may be supported by the storage system.

28 Claims, 8 Drawing Sheets

Block Remapping Table

Hash Indirection Table

| Virtual Address | PGT Index N Version | | |
|---|---|---|---|
| | Ver. 0 | Ver. 1 | Ver. 2 |
| 0 | 14 | 12 | ... |
| 1 | 1 | 15 | 13 |
| 2 | 2 | 16 | 27 |
| 3 | 28 | ... | ... |
| 4 | 29 | ... | ... |
| 5 | 17 | ... | ... |
| ... | ... | ... | ... |
| 14 | 3 | ... | ... |
| 15 | ... | ... | ... |
| 16 | ... | ... | ... |
| ... | ... | ... | ... |

Block Remapping Table

Parity Group Table

| PGT Entry | Segment | Next Entry In Parity Group | Type | Checksum |
|---|---|---|---|---|
| 0 | ... | 2 | D | 09 |
| 1 | D2.354 | 3 | D | 29 |
| 2 | D3.231 | 1 | P | 66 |
| 3 | D4.134 | | | |
| 4 | | | | |
| ... | | | | |
| 12 | D1.132 | 13 | D | 32 |
| 13 | D2.542 | 27 | D | 14 |
| 14 | D1.565 | 15 | D | 37 |
| 15 | D2.278 | 16 | D | 69 |
| 16 | D3.137 | 17 | D | 89 |
| 17 | D4.243 | 14 | P | 08 |
| ... | | | | |
| 26 | ... | ... | | |
| 27 | D3.104 | 28 | D | 19 |
| 28 | D4.210 | 29 | D | 94 |
| 29 | D5.070 | 12 | P | 15 |
| ... | | | | |

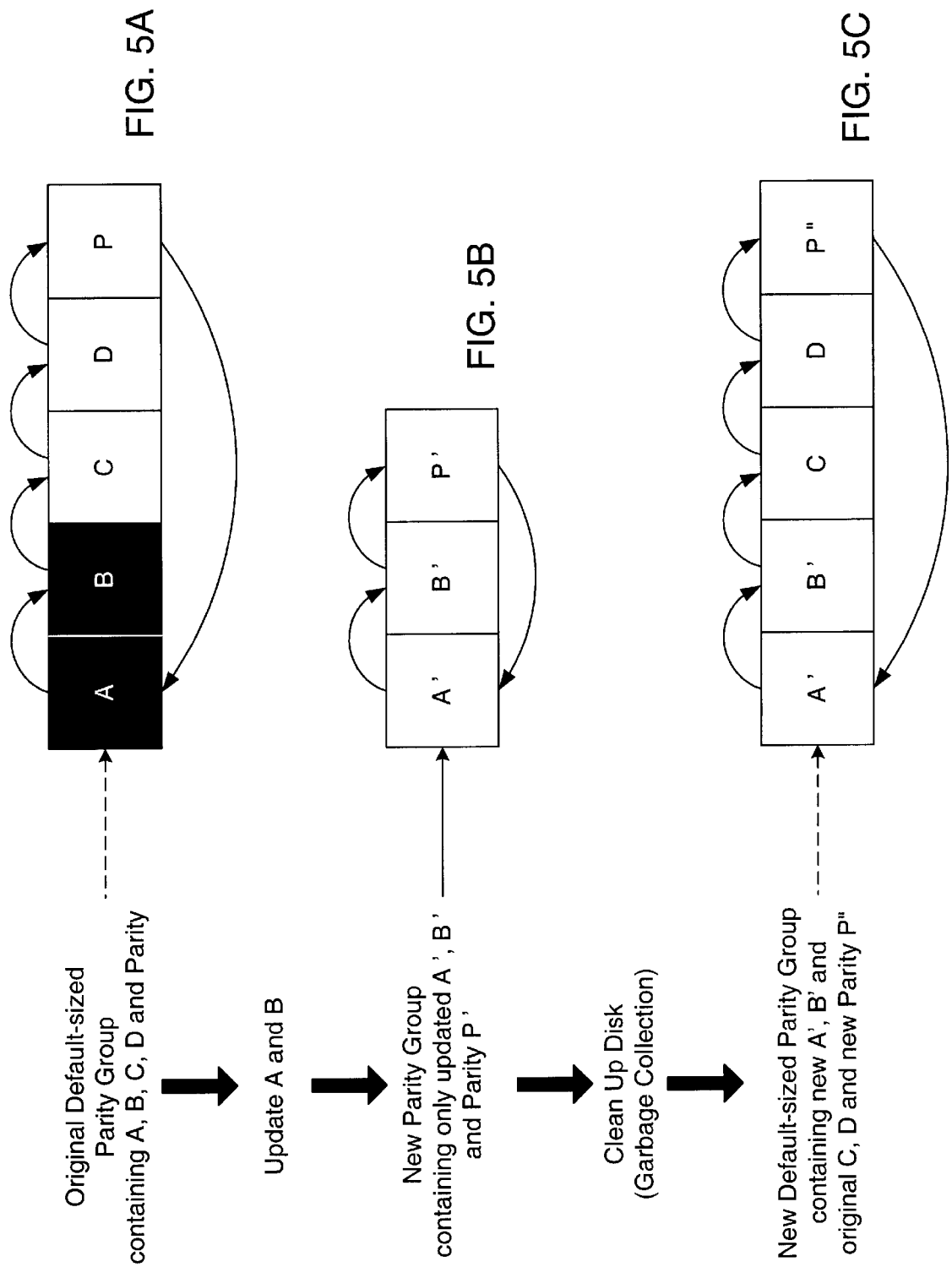

Free Segment Bitmap

| | Drive 0 | Drive 1 | Drive 2 | Drive 3 | |
|---|---|---|---|---|---|
| Current Head Position ---->> | 10100 | 10011 | 10001 | 10110 | |
| | 10011 | 11000 | 11100 | 10000 | 3 |
| | 11001 | 11001 | 11100 | 10101 | |
| | ... | ... | ... | ... | ... |
| Disk Head Offset | -2 | | -1 | | 0 |

Block Remapping Table
Hash Indirection Table

| Virtual Address | PGT Index |
|---|---|
| 0 | |
| 1 | 12 |
| 2 | 13 |
| 3 | 27 |
| 4 | 28 |
| 5 | 29 |
| ... | ... |
| 14 | |
| 15 | |
| 16 | |
| ... | |

Block Remapping Table
Parity Group Table

| PGT Entry | Segment | Next Entry In Parity Group | Type | Check sum |
|---|---|---|---|---|
| 0 | | | E | |
| ... | ... | ... | | ... |
| 12 | D1.132 | 13 | D | 32 |
| 13 | D2.542 | 27 | D | 14 |
| ... | ... | ... | | ... |
| 26 | | | E | 19 |
| 27 | D3.104 | 28 | D | 19 |
| 28 | D4.210 | 29 | D | 94 |
| 29 | D5.070 | 12 | P | 15 |

Block Remapping Table

Hash Indirection Table

| Virtual Address | PGT Index |
|---|---|
| 0 | 14 |
| 1 | 15 |
| 2 | 27 |
| 3 | 28 |
| 4 | 29 |
| 5 | 16 |
| ... | ... |
| 14 | ... |
| 15 | ... |
| 16 | ... |
| ... | ... |

FIG. 7A

Block Remapping Table

Parity Group Table

| PGT Entry | Segment | Next Entry In Parity Group | Type | Check sum |
|---|---|---|---|---|
| 0 | ... | ... | E | ... |
| ... | | | | |
| 12 | D1.132 | 13 | D | 32 |
| 13 | D2.542 | 27 | D | 14 |
| 14 | D1.565 | 15 | D | 37 |
| 15 | D2.278 | 16 | D | 69 |
| 16 | D3.137 | 14 | P | 42 |
| ... | | | | |
| 26 | ... | ... | E | ... |
| 27 | D3.104 | 28 | D | 19 |
| 28 | D4.210 | 29 | D | 94 |
| 29 | D5.070 | 12 | P | 15 |
| ... | | | | |

FIG. 7B

Block Remapping Table

Hash Indirection Table

| Virtual Address | PGT Index N Version | | |
|---|---|---|---|
| | Ver. 0 | Ver. 1 | Ver. 2 |
| 0 | 14 | 12 | ... |
| 1 | 1 | 15 | 13 |
| 2 | 2 | 16 | 27 |
| 3 | 28 | ... | ... |
| 4 | 29 | ... | ... |
| 5 | 17 | ... | ... |
| ... | ... | ... | ... |
| 14 | 3 | ... | ... |
| 15 | ... | ... | ... |
| 16 | ... | ... | ... |
| ... | | | |

FIG. 8A

Block Remapping Table

Parity Group Table

| PGT Entry | Segment | Next Entry In Parity Group | Type | Checksum |
|---|---|---|---|---|
| 0 | ... | 2 | D | 09 |
| 1 | D2.354 | 3 | D | 29 |
| 2 | D3.231 | 1 | P | 66 |
| 3 | D4.134 | | | |
| 4 | | | | |
| ... | | | | |
| 12 | D1.132 | 13 | D | 32 |
| 13 | D2.542 | 27 | D | 14 |
| 14 | D1.565 | 15 | D | 37 |
| 15 | D2.278 | 16 | D | 69 |
| 16 | D3.137 | 17 | D | 89 |
| 17 | D4.243 | 14 | P | 08 |
| ... | | ... | | |
| 26 | | | | |
| 27 | D3.104 | 28 | D | 19 |
| 28 | D4.210 | 29 | D | 94 |
| 29 | D5.070 | 12 | P | 15 |
| ... | | | | |

FIG. 8B

DATA STORAGE ARRAY EMPLOYING BLOCK CHECKSUMS AND DYNAMIC STRIPING

BACKGROUND OF THE INVENTION

1. Field of the Invention

This invention relates to computer data storage systems, and more particularly, to Redundant Array of Inexpensive Disks (RAID) systems and data striping techniques.

2. Description of the Related Art

A continuing desire exists in the computer industry to consistently improve the performance and reliability of computer systems over time. For the most part, the desire for improved performance has been achieved for the processing or microprocessor components of computer systems. Microprocessor performance has steadily improved over the years. However, the performance of the microprocessor or processors in a computer system is only one component of the overall performance of the computer system. For example, the computer memory system must be able to keep up with the demands of the processor or the processor will become stalled waiting for data from the memory system. Generally computer memory systems have been able to keep up with processor performance through increased capacities, lower access times, new memory architectures, caching, interleaving and other techniques.

Another critical component to the overall performance of a computer system is the I/O system performance. For most applications the performance of the mass storage system or disk storage system is the critical performance component of a computer's I/O system. For example, when an application requires access to more data or information than it has room in allocated system memory, the data may be paged in/out of disk storage to/from the system memory. A page may be a unit (e.g. fixed number of bytes) of data that is brought into system memory from disk storage when a requested item of data is not already in system memory. Typically the computer system's operating system copies one or more pages from the disk storage system to system memory. A page may be a fixed number of bytes recognized by the operating system. When a program needs a page that is not in main memory, the operating system copies the required page into main memory and copies another page back to the disk system. Processing may be stalled while the program is waiting for the page to be copied. If storage system performance does not keep pace with performance gains in other components of a computer system, then delays in storage system accesses may overshadow performance gains elsewhere. Computer storage systems must also reliably store data. Many computer applications cannot tolerate data storage errors. Even if data errors are recoverable, data recovery operations may have a negative impact on performance.

One method that has been employed to increase the capacity, performance and reliability of disk storage systems is to employ an array of storage devices. An example of such an array of storage devices is a Redundant Array of Independent (or Inexpensive) Disks (RAID). A RAID system improves storage performance by providing parallel data paths to read and write information over an array of disks. By reading and writing multiple disks simultaneously, the storage system performance may be greatly improved. For example, an array of four disks that can be read and written simultaneously may provide a data rate almost four times that of a single disk. However, using arrays of multiple disks comes with the disadvantage of increasing failure rates. In the example of a four disk array above, the mean time between failure (MTBF) for the array will be one-fourth that of a single disk. It is not uncommon for storage device arrays to include many more than four disks, shortening the mean time between failure from years to months or even weeks. RAID systems may address this reliability issue by employing parity or redundancy so that data lost from a device failure may be recovered.

One common RAID technique or algorithm is referred to as RAID 0. RAID 0 is an example of a RAID algorithm used to improve performance by attempting to balance the storage system load over as many of the disks as possible. RAID 0 implements a striped disk array in which data is broken down into blocks and each block is written to a separate disk drive. Thus, this technique may be referred to as striping. I/O performance may be improved by spreading the I/O load across multiple drives since blocks of data will not be concentrated on any one particular drive. However, a disadvantage of RAID 0 systems is that they do not provide for any data redundancy and are thus not fault tolerant.

RAID 5 is an example of a RAID algorithm that provides some fault tolerance and load balancing. FIG. 1 illustrates a RAID 5 system, in which both data and parity information are striped across the storage device array. In a RAID 5 system, the parity information is computed over fixed size and fixed location stripes of data that span all the disks of the array. Together, each such stripe of data and its parity block form a fixed size, fixed location parity group. When a subset of the data blocks within a parity group is updated, the parity must also be updated. The parity may be updated in either of two ways. The parity may be updated by reading the remaining unchanged data blocks and computing a new parity in conjunction with the new blocks, or reading the old version of the changed data blocks, comparing them with the new data blocks, and applying the difference to the parity. However, in either case, the additional read and write operations can limit performance. This limitation is known as a small-write penalty problem. RAID 5 systems can withstand a single device failure by using the parity information to rebuild a failed disk.

Additionally, a further enhancement to the several levels of RAID architecture is a an algorithm known as write-anywhere. As noted above in the RAID 5 system, once the data striping is performed, that data stays in the same fixed, physical location on the disks. Thus, the parity information as well as the data is read from and written to the same place. In systems that employ the write-anywhere algorithm, when an update occurs, the new data is not immediately merged with the old data. The new data is cached and the system reads the unmodified data. The unmodified data and the new data are merged, the new parity is calculated and the new data and parity are written to new locations on the disks within the array group. The write-anywhere technique may reduce overhead associated with head seek and disk rotational latencies caused by having to wait for the head to get to the location of the data and parity stripes on the disks in the arrays. Although the write-anywhere technique may alleviate some of the efficiency overhead mentioned above, it is desirable to make further improvements to the system efficiency.

Another problem encountered with disk storage systems is that disk drives may occasionally corrupt data. The corruptions may occur for various different reasons. For example, firmware bugs in the disk drive controller's firmware may cause bits in a sector to be modified or may cause blocks to be written to the wrong address. Such bugs may cause storage drives to write the wrong data, write the correct data to the wrong place, or not write at all. Another source of errors may be a drive's write cache. Many disk drives employ write caches to quickly accept writes so that the host or array controller can continue with other commands. The data is later copied from the write cache to the disk media. However, write cache errors may cause some acknowledged writes to never reach the disk media. The end result of such bugs or errors is that the data at a given block may be corrupted or stale (e.g. not the current version). These types of errors may be "silent" because the drive may not realize that it has erred. If left undetected, such errors may have detrimental consequences, such as undetected long term data corruption. Depending on how long backup copies are kept, or if they are even kept at all, such undetected errors may not even be fixable via backup.

Conventional RAID organizations do not offer protection for such silent errors. Typical RAID systems may recover well from an "identifiable failure", such as a broken disk drive (e.g. a disk drive not responding to commands). However, typical RAID systems may not be able to easily or efficiently recover from silent disk drive errors. A RAID stripe's integrity could be checked upon each read or update to check for such errors. However, this option would generate a great deal of I/O operations. For example, if only a single block was read or updated, all blocks of the stripe including the parity block would have to be read, parity calculated, and then checked against the old parity. Also, if the stripe is incorrect (e.g. the XOR of all data blocks do not match the parity block), there is no way to know which block or blocks are wrong.

SUMMARY OF THE INVENTION

In a system in which a host computer interacts with a storage array via virtual address, each data block may have a virtual block address. When a data block is written to the storage system, a physical location may be chosen by the storage system at which the data block is stored within the storage system. An indirection map may be maintained which matches virtual block address (used by the host system or file system) to physical block address (e.g. address of the actual location on a storage device of the storage array where a data block is stored). Data blocks may be organized within the storage system as stripes in which the blocks of a stripe are stored across multiple different storage devices of a storage array. A stripe may be a parity group in which multiple data blocks and a parity block for the data blocks are stored as a stripe across the storage devices. Dynamic striping may be employed so that new writes form new parity groups. Thus, stripes of various sizes may be supported by the storage system. For example, if a subset of data blocks of a current parity group are modified by a write transaction, instead of recalculating the parity for the current stripe and rewriting the modified data blocks and parity block of the current strip, a new parity group is created of only the modified blocks and a new parity block may be calculated and stored for the new parity group.

An indirection map is maintained for mapping virtual addresses to physical addresses. The indirection map may also include a parity group pointer for each data block that points to a next member of that parity group, thus linking all the blocks of a particular stripe together. With dynamic striping if a particular stripe is written and then later a part of that strip is updated, there's no need to perform a partial stripe write and recalculation of parity that is so inefficient in conventional systems. Instead, the newly written blocks become part of a new stripe. The unmodified blocks in the original stripe and the newly modified blocks may later be coalesced into a new stripe having a default size number of blocks. The recoalescing of different size stripes may be accomplished via pointer adjustment in the indirection map.

Each blocks entry in the indirection map may also include a checksum for that block. In some embodiments the checksum may be relatively small, e.g. only a few bytes. Thus, it's inclusion in the indirection map does not significantly change the size of the map. Furthermore, no extra I/O operations are needed to read the checksum since checksum lookup may be combined with the physical address lookup. When a block is read, its indirection map entry is read to find the block's physical address and retrieve the block's checksum. If a block is written, its indirection map entry is updated to indicate the new physical address for the block and the new checksum is also written to the indirection map entry. Any mechanism used to cache and manage indirection map entries will also cache and manage the checksums.

A storage system may include a plurality of storage devices each having a plurality of addressable locations for storing data. A storage controller may be coupled to the storage devices and configured to store and retrieve data from the storage devices. An indirection map may be stored within the system having a plurality of map entries each configured to map a virtual address to a physical address on the storage devices. Each map entry may also store a checksum for data stored at the physical address indicated by the map entry. The storage controller may receive storage requests specifying a virtual address and may access the indirection map for each storage request to obtain the corresponding physical address and checksum.

In one embodiment, a storage controller or array controller may be configured to store a stripe of data as a parity group across a number of the storage devices. The parity group includes a plurality of data blocks and a parity block calculated for the data blocks. The storage controller may receive a write transaction modifying a subset of the data blocks. The controller may calculate a new parity block for the subset of data blocks and store the modified subset of blocks and new parity block as a new parity group at new physical addresses striped across the storage devices. The controller also stores checksums for each block of the parity groups.

A method for storing data in a storage system may include storing a stripe of data across a plurality of storage devices. The data stripe includes a plurality of data blocks and a parity block calculated for the data blocks. The method may further include storing entries in an indirection map for each data stripe unit, and each entry may map a virtual address to a physical address for one of the data stripe units and store a checksum for that data stripe unit. The method may further include receiving a write transaction specifying the virtual addresses of a subset of the data blocks of a data stripe. A new parity block may be calculated for the subset of the data blocks, and the method may include storing only that subset of data blocks and the new parity block as a new parity group to new physical addresses striped across the storage devices. The method may also include updating the entries in the indirection map for the data blocks modified by the write transaction to indicate the new physical address and checksum for each modified data block.

A method for storing data in a storage system may include storing data stripe units across a plurality of storage devices and storing entries in an indirection map for each data stripe unit. Each indirection map entry maps a virtual address to a physical address and further stores a checksum for the stripe unit corresponding to that entry. A read request may be received specifying the virtual address of one of the stripe units and the indirection map entry corresponding to the virtual address may be accessed to obtain the physical address and corresponding checksum. In response to the read request the stripe unit at the physical address mapped to the virtual address indicated by the read request and the corresponding checksum may be returned.

BRIEF DESCRIPTION OF THE DRAWINGS

FIGS. 5A, 5B and 5C, are drawings depicting the operation of the storage controller of FIG. 3, according to an embodiment;

FIG. 7A is a drawing of an embodiment of a modified hashed indirection table of FIG. 6B;

FIG. 7B is a drawing of one embodiment of a modified parity group table of FIG. 6C;

FIG. 8A is a drawing of an embodiment of a hashed indirection table which maintains generational images; and FIG. 8B is a drawing of an embodiment of a modified version of the parity group table of FIG. 7B.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
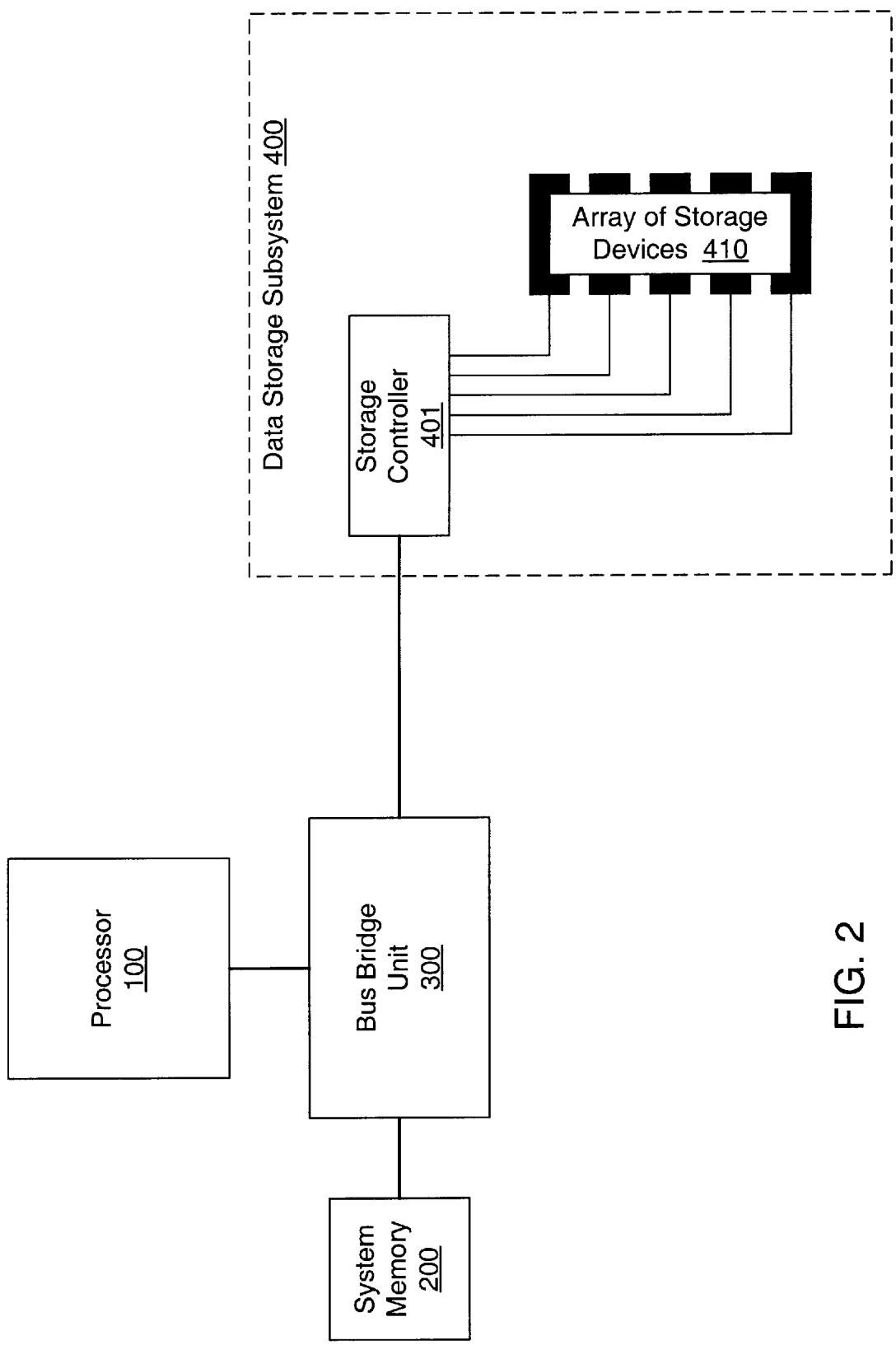
FIG. 2 is a block diagram of one embodiment of a computer system including a data storage subsystem.

Refer now to FIG. 2, a block diagram of one embodiment of a computer system including a data storage subsystem. The computer system includes a main processor 100 coupled to a bus bridge unit 300. Bus bridge unit 300 is coupled to a system memory 200 and to a data storage subsystem 400. System memory 200 may be used by processor 100 to temporarily store data and software instructions which need to be accessed rapidly during system operation. Bus bridge 300 may contain hardware to control system memory 200 and interface to data storage subsystem 400. As will be described further below, data storage subsystem 400 includes an array of storage devices which may also store data and software instructions.

Figure 1:
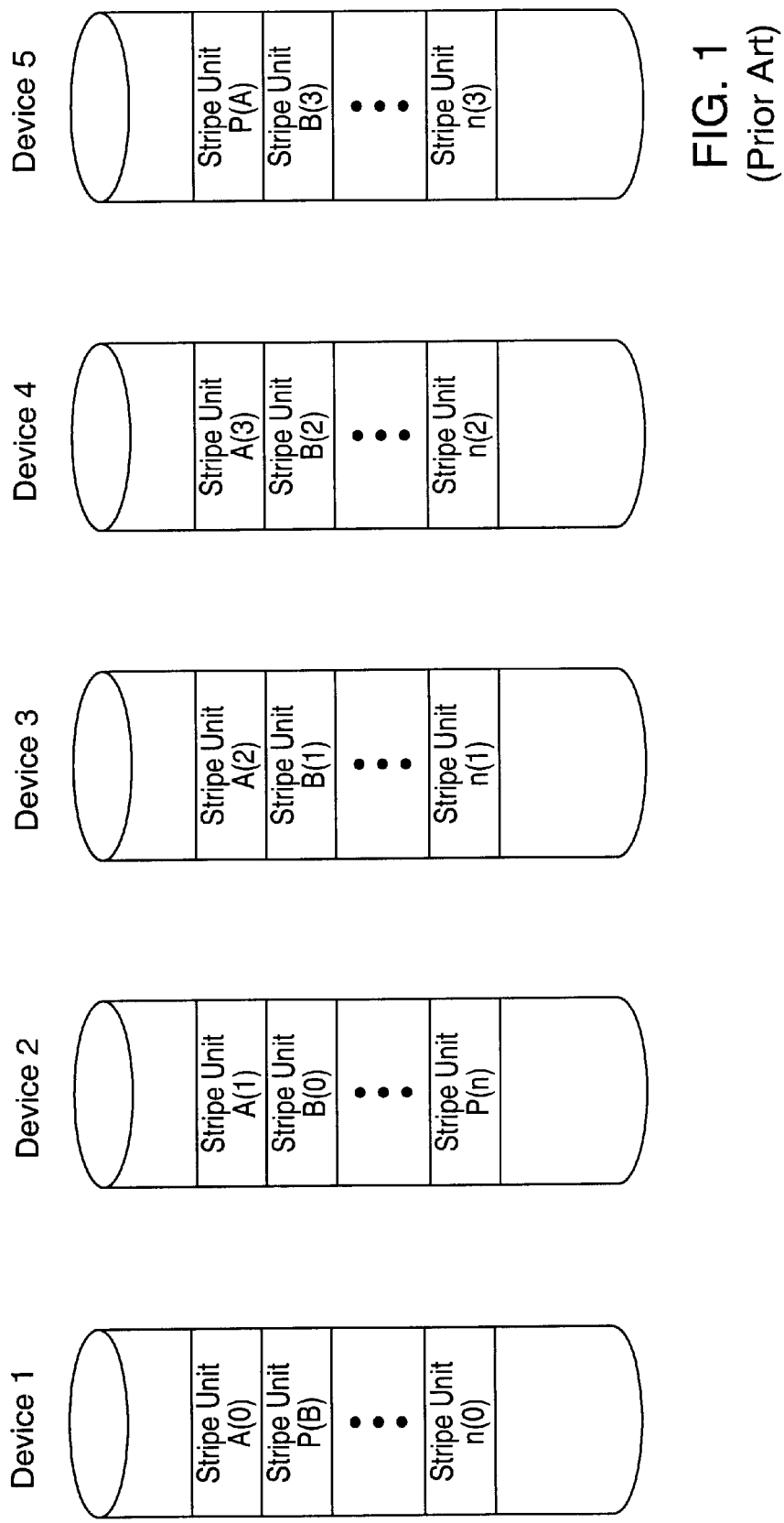
FIG. 1 is a diagram of one embodiment of a conventional RAID 5 storage arrangement.
Figure 3:
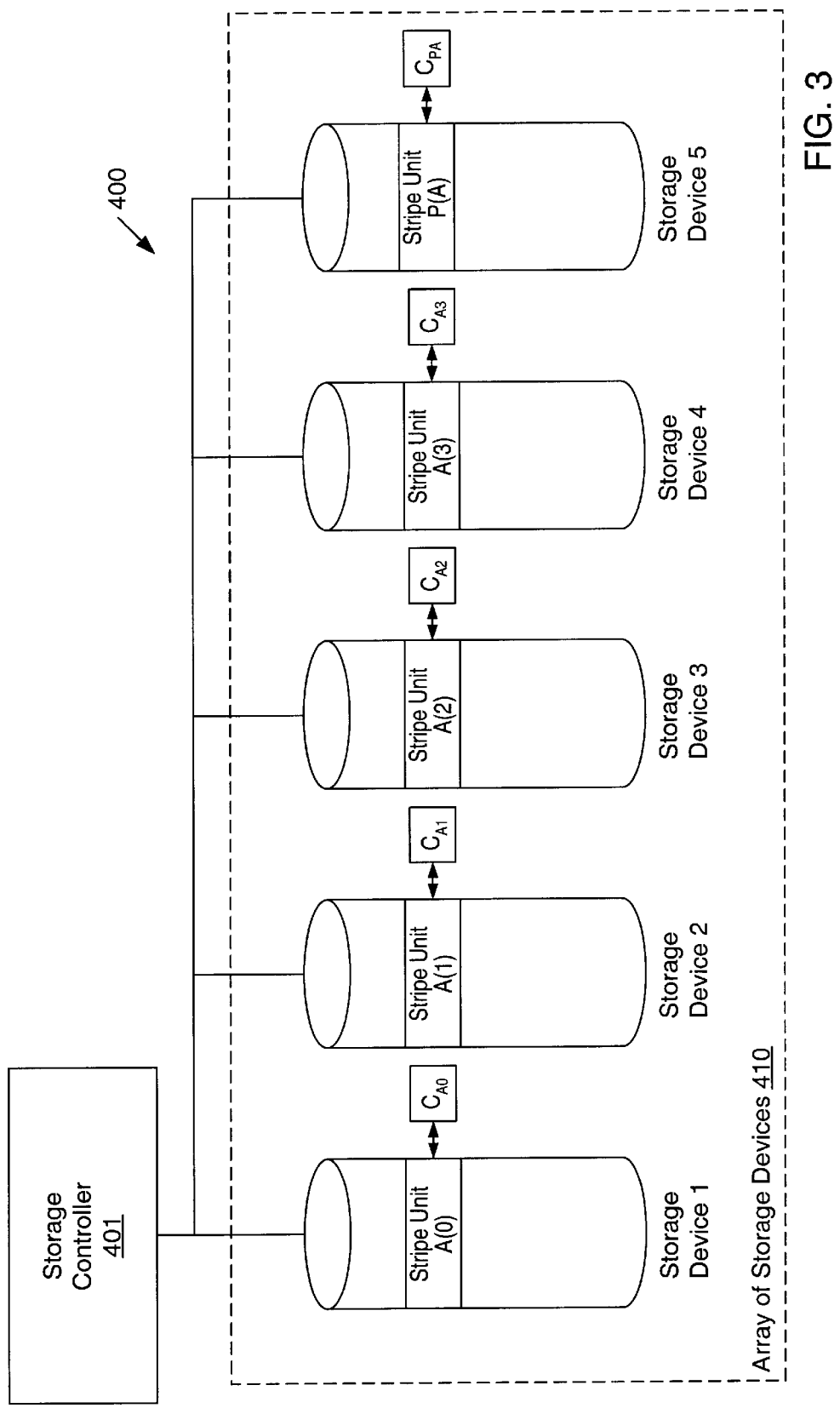
FIG. 3 is one embodiment of a data storage subsystem.

Turning now to FIG. 3, one embodiment of a data storage subsystem is shown. System components that correspond to those shown in FIG. 2 are numbered identically for simplicity and clarity. The data storage subsystem 400 of FIG. 2 includes a storage controller 401 coupled to an array of storage devices 410. In this embodiment, array of storage devices 410 may include five storage devices shown as storage device 1 through storage device 5. When processor 100 of FIG. 2 writes data to data storage subsystem 400, storage controller 401 of FIG. 3 is configured to separate the data into blocks and distribute the blocks across array of storage devices 410, similar to the manner shown in FIG. 1 and described in the description of a RAID 5 system in the background section. A parity block P(A) is computed for the 'A' data blocks and the result of the data write is shown in FIG. 3. The data has been divided into four data blocks, A(0) through A(3) and stored on storage devices 1 through 4, respectively. Parity block P(A) is stored in storage device 5. As will be described in more detail below in FIG. 4, if more data is to be stored, storage controller 401 again distributes the data blocks across array of storage devices 410. Note that while storage controller 401 is illustrated as a dedicated array controller in FIGS. 2 and 3, in other embodiments, storage controller may be implemented in a server or host computer and/or may be implemented in software executed, e.g. processor 100.

As discussed in the Background section, disk drive storage devices may occasionally corrupt data. The corruptions may occur for several reasons. For example, firmware bugs may cause bits in a sector to be modified or may cause blocks to be written to the wrong address. Write cache errors may cause some acknowledged writes to never hit disk media. These types of errors may be "silent" because the drive does not realize that it has erred. If left undetected, such errors may have detrimental consequences such as undetected long term data corruption that is not even fixable via backup.

This silent error problem may be addressed by using checksums. Each block of data in the storage system has a checksum associated with the block of data. The checksums may be several bytes in size, and can be computed via a variety of algorithms such as XOR, CRC, etc. In one embodiment, a checksum may be a numerical value based on the number of set bits in a block. The checksums may be much smaller than their corresponding blocks. Corrupt or stale data may be detected via the checksums. FIG. 3 illustrates checksums $C_{A0}$ through $C_{A3}$ corresponding to data blocks A(0) through A(3) and checksum $C_{PA}$ corresponding to parity block P(A). The checksums may be calculated by, for example, a drive array controller or host system and sent as part of or in conjunction with a storage request with the data to be written.

A checksum(s) may be read during a read operation of the corresponding block(s). For example, a host system or array controller may issue a storage request indicating a read operation for one or more blocks of data. In one embodiment, the checksum(s) is read first, then the corresponding data block(s) is read and compared with the checksum (e.g. as part of a storage read request by an array controller or host). If the two match, the data block contains the correct bits with very high probability. Alternately, a data block(s) and its corresponding checksum(s) may be read together so that both the block and the checksum may be returned together in response to the read request. In this embodiment, the data returned may be checked at various points during its path (e.g. from disk to array controller or host).

During a write operation, the data to be written and a corresponding checksum may be passed to a drive to be written. The data may be compared with its checksum to insure that the data to be written is correct. In one embodiment, a drive controller for the drive receiving the write operation may perform this checksum comparison. Then both the data and checksum may be written to disk.

The checksum may be generated by a host system's file system or by a storage controller, for example. The checksum for each block may be stored in a variety of places. In one embodiment, the disk block size is extended and the checksum amended at the end of the disk location where the block corresponding to that checksum is stored. In such an embodiment, a single read or write may retrieve/store both the data and the checksum. However, such an embodiment may offer less protection from stale data errors. For example, if the disk drive fails to perform the write correctly, the checksum may also not be written, and the error therefore may not be caught on any subsequent read.

In one embodiment, the checksum for each block is written separately from the data (or parity) block (e.g. by a separate write transaction to disk). This embodiment may offer improved protection against stale or silent errors since it is less likely that the block write and its separate checksum write would both be performed erroneously. However, this approach may double the number of I/O's: in addition to the block, the checksum has to be read for every READ operation and written for every WRITE operation. In one embodiment, the checksums may be cached, e.g. by the disk controller for the disk where the corresponding block is written. Since the checksums may be much smaller than their corresponding blocks, many or all of the checksums may be stored in a cache or other fast non-disk memory. However, if the checksum memory is volatile, it may be desirable to store the checksums to a non-volatile memory (e.g. disk) to avoid loss.

Thus, a disk array architecture may be extended to associate a checksum with each block (e.g. data or parity) to guard against silent disk errors. For example, in a checksum-extended RAID 5 architecture, in addition to the conventional RAID 5 architecture of several data blocks and one parity block, a separate checksum is included for each data (and parity) block. While the conventional RAID 5 organization has only one verifiable relationship—the horizontal parity relationship—this checksum-extended organization has the parity relationship and individual relationships between the blocks and their checksum copies. These extra relationships may allow for the detection of silent errors and for more accurate error diagnosis and correction. Upon a READ, the disk array may retrieve both the data block and its checksum. The block received from the READ may be compared to the checksum received from the READ (e.g. by recalculating the checksum from the data and comparing the new checksum to the read checksum). If they do not match, an error may be detected immediately. If an error is detected, all available relationships (both checksum and parity) may be used to identify (and possibly correct) the error.

The checksum extension embodiments described herein are not limited to any particular storage organization. For example, similar checksum error handling techniques may also be used with RAID 1 configurations, where each block has its own checksum. Also, different embodiments may employ different algorithms to compute the checksum. Examples of checksum algorithms range from a simple XOR computation, to an additive checksum, to a CRC (cyclical redundancy check), etc.

The block-level checksum organization described herein may provide for the detection of and recovery from many more data error conditions than in conventional storage organizations, such as RAID 5. However, as discussed above, the use of block-level checksums in some embodiments may effect performance in that additional read and write operations may be performed for the checksums.

Figure 4:
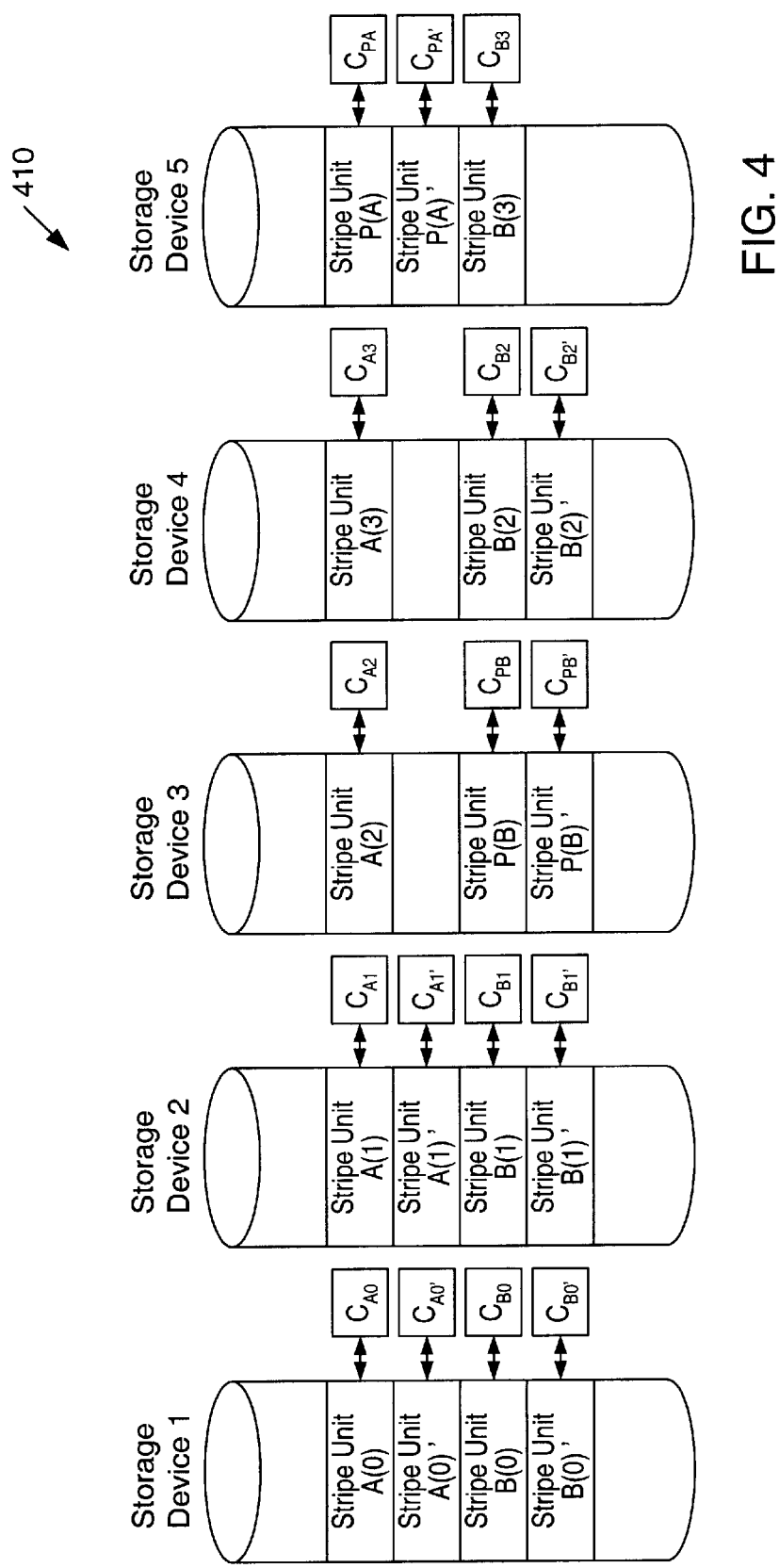
FIG. 4 is an embodiment of an array of storage devices employing dynamic data striping.

Referring now to FIG. 4, an embodiment of an array of storage devices employing dynamic striping with block-level checksums is illustrated. Dynamic striping with block-level checksums may improve the overall performance of the storage system with little or no additional overhead for supporting block-level checksums. Circuit components that correspond to those shown in FIG. 3 are numbered identically for simplicity and clarity. In the array 410 of FIG. 4, data and parity are striped across the storage devices 1 through 5. The data stripe corresponding to data and parity blocks for the A data blocks are the same as that shown in FIG. 3. When processor 100 of FIG. 1 writes new data to array of storage devices 410 of FIG. 4, the data is again striped across the storage devices. In this example, data stripe 'B' represents new data written to array of storage devices 410. The data is broken into four blocks (stripe units), B(0) through B(3) and a parity block P(B) is calculated. The data blocks B(0) through B(3) and P(B) are stored across the storage devices such that the data and parity blocks are not stored on the same storage device. A checksum is associated with each block, as illustrated by checksums $C_{A0}$–$C_{A3}$, $C_{PA}$, $C_{B0}$–$C_{B3}$ and $C_{PB}$.

When data in data stripe 'A' is to be modified, instead of recalculating parity for the original stripe 'A' and writing over the original blocks being modified, only the data blocks to be modified and a new parity block are written as a new stripe. New checksums are provided for each block of the new stripe. In this example, data blocks A(0) and A(1) are modified and A(0)' and A(1)' represent the modified data. Storage controller 401 of FIG. 3 calculates a new parity block P(A)'. Corresponding block checksums $C_{A0'}$, $C_{A1'}$ and $C_{PA'}$ are provided for each block of the new stripe. Data blocks A(0)', A(1)' and parity block P(A)' form a new parity group which has fewer data blocks than the original parity group formed by A(0) through A(3) and P(A). The new parity group is stored to new locations in, for example, storage devices 1, 2 and 5. Similarly, if data in data stripe 'B' is to be modified, the modified data blocks and a new parity block are written. In this example, data blocks B(0), B(1) and B(2) are modified and B(0)', B(1)' and B(2)' represent the modified data and $C_{B0'}$, $C_{B1'}$ and $C_{B2'}$ represent the corresponding new checksums. Parity block P(B)' represents the new parity block for the new parity group formed by B(0)', B(1)' and B(2)', and $C_{PB'}$ represents the new checksum for the parity block P(B)'. This new parity group also contains a different number of blocks than the original parity group formed by B(0) through B(3) and P(B).

The parity block P(B)' and the new parity group are stored to new locations in storage devices 1 through 4. To reconstruct data in the event of a device failure, the blocks of new data that comprise a data stripe may be stored in locations on different devices. Thus, in one embodiment the only restriction on where blocks are stored is that no two blocks from the same parity group should be stored on the same storage device. However, to reduce the overhead associated with data copying between devices, e.g. during garbage collection, it may be useful to write each modified data block to the same device that the corresponding original data block was on. Alternatively, each modified data block may be stored to a device that contains no blocks from the original data stripe.

Turning collectively to FIGS. 5A, 5B and 5C, drawings depicting the operation of an embodiment of storage controller 401 of FIG. 3 are shown. In particular, this example shows, using FIGS. 5A and 5B, how a new parity group is formed from an existing parity group when some of the data blocks of FIG. 5A require modification. Additionally, FIG. 5C, illustrates an embodiment of how storage controller 401 of FIG. 3 may periodically realign non-uniformly sized parity groups into default sized parity groups.

FIG. 5A shows a parity group consisting of data blocks A, B, C, D and parity block P. Blocks A and B are shaded to indicate that those data blocks require modification. FIG. 5B illustrates the modified data blocks A' and B'. As described above in FIG. 4 a new parity block P' is calculated, but it is calculated only for A' and B' in FIG. 5B. Thus, a new parity group is formed containing only A', B' and P'. The older version of A and B data blocks still exist in the storage devices since the new data blocks are stored to new locations. Also, blocks C and D are still protected after the new parity group of A', B' and P' is formed since the original parity group (A, B, C, D and P) still exists on the drives. In embodiments in which the parity calculation requires at least two pieces of data, in a case where only a single block of data requires modification, the parity information may be a mirrored image of the data block itself.

As new parity groups are stored to new locations, the storage devices may begin to run out of free segments to store new parity groups. To manage this, the storage controller 401 of FIG. 3, may be configured to collect different sized parity groups and combine them into default sized parity groups. The collection and combining operations may be referred to as garbage collection. Storage controller 401 may perform these garbage collection operations either when the system is idle, when the number of free segments falls below a predetermined number, or periodically. New parity blocks are calculated and the new default-sized parity groups are then stored to new locations, thereby effectively freeing up segments on the storage devices. In FIG. 5C, a new parity group is shown. The new parity group comprises A', B', C, D and a new parity block P'', which is calculated over only those data blocks in the new parity group. The new default-sized parity group is then stored to a new location. As will be described further below, the parity blocks are calculated using an exclusive OR of the data in the blocks being protected. After the new parity group of A', B', C, D and P'' is formed, the old versions A, B, P and P' (and their checksums) are no longer needed (since all the latest versions A', B', C, and D are now protected by P''), and their space may be reclaimed. As described above, each block of the new parity group may have a corresponding checksum (not shown in FIG. 5).

Alternatively, in a file system which maintains older versions of data, the original version (and corresponding checksums) of the default-sized parity group shown in FIG. 5A may be maintained on the storage devices to accommodate retrieval by a system user at a later time. The older versions are sometimes referred to as generational images. Generational images are described in more detail below.

Storage controller 401 of FIG. 3 may execute a software algorithm to keep track of where the data is stored and what relationship one piece of data has to another piece of data. The software algorithm may take many forms and in an effort to describe the process by way of example, the figures below describe a bitmap and a series of tables to illustrate the process. It is noted however, that the bitmap and tables are only examples of how a software algorithm may be implemented.

Figures 6A, 6B, 6C:
FIG. 6A is a drawing of an embodiment of a free segment bitmap.
FIG. 6B is a drawing of an embodiment of a hashed indirection table.
FIG. 6C is a drawing of an embodiment of a parity group table including checksums.

Turning now to FIG. 6A, a drawing of an embodiment of a free segment bitmap is shown. In this example, storage controller 401 of FIG. 3 maintains the free segment bitmap. The free segment bitmap shown in FIG. 6A keeps track of all physical segments on all storage devices. The bitmap indicates whether a particular segment contains valid data or not by indicating a one or zero, respectively. For example a zero may indicate a free segment, while a one may indicate that segment contains valid data. If a segment does not contain valid data, then that segment is assumed to be free and new data may be stored in that segment. In the example shown in FIG. 6A, the bitmap is arranged in rows and columns. The columns are divided into columns of separate disk drives. Each disk drive column has columns of ones and zeros representing segments with valid data and free segments on the drives.

To facilitate storing data to free segments that are due to be passing under the heads soon, the bitmap may also indicate the current position of each disk head if the storage devices are hard disk drives. For example, in FIG. 6A, a current head position pointer points to a row in the free segment bitmap. A single row may represent an entire track on a disk and therefore all the segments in that track, or if finer granularity is necessary, a row may represent only a portion of a track with a smaller number of segments. In this example, each row contains five segments. Therefore the current head position pointer has a granularity of five segments. The amount of calculation effort by storage controller 401 of FIG. 3 may increase for finer granularities.

Additionally, if hard disk drives are used that are not synchronized to each other and exhibit drifting of the disk rotational speed relative to each other or to a norm, the free segment bitmap may maintain a calibration offset value for each drive corresponding to an offset relative to the theoretical position indicated by the current head position pointer. The calibration offset is used to calculate the current head position of each disk head. For example, a calibration offset of 3 on disk head one would indicate that the actual position the disk head is three segments ahead of the position indicated by the current head position pointer. The offset value is recalibrated from time to time due to the drift exhibited by the individual disks in the system. A recalibration is performed by knowing where the last read was performed and knowing the current rotational speed of a drive. Alternatively, to reduce the calculation efforts necessary for maintaining a calibration offset for each disk head, while still allowing non-synchronous disk drive to be used, a current head position pointer may be implemented for each disk head. The free segment bitmap shown in FIG. 6A depicts only the embodiment using a single current disk head pointer and calibration offset values.

As described above, the storage controller 401 of FIG. 3 keeps track of both the location of data and the parity and parity group information corresponding to that data. To facilitate keeping track of the data and parity information, a block remapping technique may be implemented in software and/or hardware which maps a logical or virtual block address to a physical storage device segment. The block remapping technique includes the use of an indirection map which may include a remapping table or tables, which are described in detail below. It is noted that, the tables below are only examples of how the remapping technique might be implemented and that other variations are possible.

FIG. 6B is a drawing of an embodiment of a hashed indirection table (HIT). The HIT maps virtual block addresses to an entry or index number in a parity group table shown in FIG. 6C.

FIG. 6C is a drawing of an embodiment of a parity group table. The parity group table (PGT) contains a series of rows referred to as entries. Each row contains several columns which map an entry number to a physical storage device segment. Each valid PGT entry also includes a back pointer to the next entry in a parity group so that the first physical segment in a parity group is linked to a second physical segment in that parity group, and the second physical segment to the third and so on, until the last physical segment contains the parity data for that parity group. The physical segment that contains the parity data is linked back to the first physical segment in the parity group, thereby creating a circular list for that parity group. Note that terms "first", "second", "third" and "last" as used in the above-description of how the entries for a parity group may be linked, do not imply any particular physical ordering, but are merely used as references for the circular-linked entries for a parity group. The PGT may also identifies the type of each PGT entry, e.g. whether the PGT entry is for a segment that holds data (D) or parity information (P) or whether the entry is empty (E). Alternatively, a separate table may be used to keep track of the free entries in the PGT. This alternative embodiment may allow for more rapid determination of where free entries in the PGT exist.

Referring collectively to FIG. 6B and FIG. 6C, in the HIT, virtual address zero maps to entry 12 in the PGT and virtual address one maps to entry number 13 in the PGT. In FIG. 6C, entry 12 contains valid data located at physical segment D1.132. This may be interpreted as Disk 1, segment 132. Entry 12 also contains data, not parity information and links physical segment D1.132 to entry number 13 in the PGT. Following the mapping, entry number 13 links to entry number 27, which links to entry number 28, which links to entry number 29 which links back to entry number 12. The information at entry number 29 is different than the others in that the physical segment D5.070 contains parity information for that parity group, as indicated by a P in the type column. The link back to entry number 12 also illustrates the circular nature of the list. As described further below, if data at any of the physical segments is modified, the HIT and PGT change to reflect the new mappings. The HIT and PGT may be collectively referred to as a block remapping table.

As discussed above, a checksum for each block may be stored as part of each block (e.g. amended to the end of each block) or stored at a separate disk location, memory table, etc. However, FIG. 6C illustrates an embodiment in which each block's checksum is stored in an entry in the indirection map, e.g. as part of a block remapping table entry (e.g. PGT entry) for each block. In some embodiments, each checksum may be fairly small compared to the block size. Thus, inclusion of the checksums in the block remapping table may not excessively increase the size of the table. When a READ or WRITE command is received for a block(s), the appropriate PGT entry is accessed to locate the block in the disk drives. Since the checksum is part of the PGT entry, it is accessed along with rest of the PGT entry. Therefore, block-level checksums may be stored in a separate physical location from the blocks and retrieved without requiring additional I/O operations.

Thus, dynamic striping and block-level checksum may be combined to address small write problems and silent error problems that are found in conventional disk arrays (e.g. RAID 5 systems) as discussed in the Background section. With dynamic striping, the host machine interacts with the storage array via virtual addresses. Each block has a virtual block address (or VBA). When a block is written, a physical location is chosen for it. An indirection map (e.g. block remapping table) matches virtual block addresses to physical block addresses. Block-level checksums may be provided in the indirection map so that a checksum may be accessed for each block without incurring additional I/O overhead beyond accessing the indirection map.

With such dynamic allocation, stripes of various sizes may be supported. New writes may form new stripes. The back pointer links all the blocks of a stripe together. If a stripe is written, and later a part of the stripe is updated, there is no need to perform the partial stripe write that is costly in RAID 5. Instead, the newly written blocks become part of a new stripe. Later the unmodified blocks in the original stripe and the newly modified blocks may be coalesced into a new, full size stripe, via pointer adjustment in the indirection map.

As shown in FIG. 6C, each block's entry in the indirection map may be extended to include a block checksum. Since in some embodiments the checksum is only a few bytes, its inclusion in the indirection map will not change the size of the map significantly in those embodiments. Also, no extra I/O to read the checksum is required since the checksum lookup may be combined with the block physical address lookup. When a block read is requested, the block's indirection map entry is read to find the block's physical address. This same map read may also retrieve the block's checksum. If a block is written, its indirection map entry is updated (or created as part of a new stripe parity group), and the new checksum written as part of the indirection map entry.

The indirection map (e.g. hashed indirection table and parity group table) may be separately stored on disk, cached, or stored in memory, for example. By including block-level checksums in the indirection map, any mechanism used to cache and/or manage indirection map entries may also cache and/or manage the checksum entries.

In one embodiment, to preserve the failure tolerance aspect of this system, no two segments belonging to the same parity group may be stored on the same physical device. Therefore, during garbage collection, affinity may be given to certain disk drives by the logical blocks being accessed. This affinity helps reduce the overhead of calculating which drives can be used during the garbage collection operations. In other words, each logical block is given a strong affinity to a particular physical disk to simplify the process of assuring that no two blocks of the same parity group (stripe) are stored on the same drive.

FIG. 7A and FIG. 7B collectively show modified drawings of the hashed indirection table and the parity group table of FIG. 6B and FIG. 6C, respectively. In this example, the HIT and PGT have been modified to reflect modifications to data in physical segments D1.132 and D2.542. These two physical segments are represented in the PGT as entry numbers 12 and 13, respectively. Since only two segments are being modified out of a parity group that contains four segments, new parity information is calculated only for the new data segments and the new data and parity is written to new physical segments D1.565, D2.278 and D3.137. This new parity group contains three blocks and must be accounted for. So referring to FIG. 7A, in the HIT, logical address 0 now maps to entry number 14 in the PGT and logical address two maps to entry number 15 in the PGT. Logical address 5 maps to the new parity information at entry number 16. Note that the PGT has also changed. Referring to FIG. 7B, the PGT now contains valid information at entry numbers 14, 15 and 16. The new parity group is linked together starting at entry number 14. The modified data from entry number 12 is now stored at D1.565, which is linked to entry number 15. The modified data from entry number 13 is now stored at D2.278 and linked to entry number 16. The new parity information is stored at D3.137 and is linked back to entry number 14. New checksums are also stored in the PGT for the new parity group. The original parity group entries are still valid at entry numbers 12 and 13, however those entries (and corresponding blocks) may be discarded if the remaining unmodified data in the parity group is realigned into a new parity group. In this example, the new data in entries 14 and 15 is now protected by the new parity in entry 16 and block checksums. The old data in entry numbers 12 and 13 is still protected by the original parity in entry number 29, as is the unmodified data in entry numbers 27 and 28. Also, the original checksums remain in PGT entries 12, 13 and 29. Until the unmodified data in entry numbers 27 and 28 is realigned, the data in entry numbers 12 and 13 is preserved to protect the data in entry numbers 27 and 28.

Referring now to FIG. 8A, a drawing of an embodiment of a hashed indirection table (HIT) which maintains generational images. In contrast to the HIT shown in FIG. 6B and in FIG. 7A, the HIT of FIG. 8A has additional columns which correspond to generational images. In this example, the PGT index columns are now labeled version zero through version two, where version zero corresponds to the most current version and version two corresponds to the oldest version. It is noted that although this example is representative of a system which maintains a current version of data and two previous generations of data, in other embodiments greater or fewer versions may be maintained by the system. Additionally, although the example shown in the HIT of FIG. 8A is a table, it is noted that in other embodiments the HIT may be implemented in other ways, such as a linked list or a double linked list, etc. The HIT is intended to be a logical representation of a mechanism for determining a PGT entry from a virtual block address. As such, FIG. 8A is a logical representation of a mechanism for determining PGT entries for multiple block generations from a virtual block address.

FIG. 8B is a drawing of an embodiment of a modified version of the parity group table (PGT) of FIG. 7B. However, in this example, the PGT of FIG. 8B has additional entries which correspond to modified data and parity.

In order to show an example of maintaining generational images, FIG. 8A and FIG. 8B are referred to collectively. In the HIT, the Ver. 2 column represents the PGT entries of data stored in physical segments which have been modified two times. The Ver. 1 column contains PGT entries which represent data that was modified one time. The Ver. 0 column represents the most current version of the entries in the PGT of FIG. 8B. Therefore, the HIT is used in the following way; if the most recent version of logical block one was requested, then PGT entry number 14 would be accessed. If the next older version was requested, PGT entry number 12 would be accessed. Similarly, if the oldest version of logical block 2 was requested, PGT entry number 27 would be accessed. In the Ver. 0 column, logical blocks one, three and four were modified during a last modification. Therefore, as the HIT entries indicate, the PGT entries one, two and three were also modified. In the PGT, entry number one contains valid data in physical segment D2.354 and links to entry number 2. Entry number two contains valid data in physical segment D3.231 and links to entry number three. Entry number three also contains valid data in physical segment D4.134 and links back to entry number one. Entry number three is also the parity information for the new parity group formed by entry number one and entry number two as indicated by the P in the data/parity column. Note that block-level checksums may be maintained for each generation.

If the data in logical blocks one or two in the HIT were to be modified again, the PGT entry numbers 13 and 27 would drop out of the HIT. Correspondingly, the physical segments D2.542 and D3.104 may be reclaimed as free segments during the next garbage collection operation.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. For example, block-level checksums may advantageously be stored as part of remapping table or indirection map entries for any type of storage system that uses virtual to physical address translation. Also, checksums may applied at various granularities, such as byte-level as opposed to block-level. It is intended that the following claims be interpreted to embrace all such variations and modifications.

What is claimed is:

1. A storage system, comprising:

a plurality of storage devices, wherein each of the storage devices comprises a plurality of addressable locations for storing data, each addressable location having a physical address;

a storage controller coupled to said plurality of storage devices, wherein said storage controller is configured to store data to and retrieve data from said plurality of storage devices;

a storage configured to store an indirection map comprising a plurality of map entries, wherein each of said map entries maps a virtual address to one of said physical addresses, and wherein each map entry stores a checksum for data stored at the physical address indicated by that map entry; and wherein said storage controller is further configured to receive storage requests specifying a virtual address, and wherein said storage controller is configured to access said indirection map for each storage request to obtain the corresponding physical address and to obtain or update the corresponding checksum.

2. The storage system as recited in claim 1, wherein:

said storage controller is configured to store a first stripe of data as a first plurality of data stripe units across ones of said plurality of storage devices; wherein each data stripe unit is stored at a different one of said physical addresses;

for each data stripe unit, one of said map entries in said indirection map is configured to map a virtual address to the physical address where that data stripe unit is written and to store the checksum for that data stripe unit.

3. The storage system as recited in claim 2, wherein when one of said storage requests is a write transaction modifying a subset of said first plurality of data stripe units, said storage controller is configured to store said subset of said first plurality of data stripe units modified by the write transaction as a new stripe to new physical addresses across ones of said plurality of storage devices, wherein said storage controller is configured to update the map entries in said indirection map for each modified data stripe unit to store the checksum for each modified data stripe unit and to indicate the new physical address for each modified data stripe unit.

4. The storage system as recited in claim 3, wherein said first plurality of data stripe units includes a first plurality of data blocks and a first parity block which is calculated for said first plurality of data blocks, wherein said storage controller is configured to calculate a new parity block for said subset of said first plurality of data blocks modified by the write transaction, and wherein said storage controller is configured to only store said subset of said first plurality of data blocks modified by the write transaction and said new parity block as the new stripe.

5. The storage system as recited in claim 4, wherein each of said entries in said indirection map further comprise a pointer to a next entry in a same parity group.

6. The storage system as recited in claim 1, wherein said storage controller is configured to receive a write transaction as one of said storage requests, wherein said write transaction comprises one or more data blocks to be written and one or more virtual addresses for the one or more data blocks; and wherein, for each data block of the write transaction, said storage controller is further configured to store a checksum in an entry in said indirection map specifying one of said physical addresses at which that data block is written.

7. The storage system as recited in claim 6, wherein the write transaction further comprises the checksum for each data block to be written, and wherein said storage controller is configured to verify that each of the one or more data blocks to be written matches its corresponding checksum before writing that data block to its physical address.

8. The storage system as recited in claim 1, wherein said storage controller is configured to receive, as one of said storage requests, a read request from a host system, wherein said read request comprises a virtual address for a data block to be read, wherein said storage controller is further configured to obtain, in a single access of said indirection map, the checksum and physical address for the data block to be read, and wherein said storage controller is configured to obtain the data block to be read from its physical address and return it and its checksum to the host system in response to the read transaction.

9. The storage system as recited in claim 1, wherein said plurality of storage devices comprise disk drives.

10. The storage system as recited in claim 1, wherein said storage configured to store an indirection map comprises one or more of said storage devices.

11. The storage system as recited in claim 10, wherein said storage controller is configured to cache a portion or all of said indirection map in a memory.

12. A system, comprising:
 a plurality of storage devices configured in an array; and
 an array controller coupled to said plurality of storage devices, wherein said array controller is configured to store a first stripe of data as a first parity group comprising a first plurality of data stripe units across ones of said plurality of storage devices, and wherein said array controller is further configured to store a checksum for each of said first plurality of data stripe units;
 wherein said first plurality of data stripe units includes a first plurality of data blocks and a first parity block which is calculated for said first plurality of data blocks;
 wherein said array controller is configured to receive a write transaction modifying a subset of said first plurality of data blocks;
 wherein said array controller is configured to calculate a new parity block for said subset of said first plurality of data blocks modified by the write transaction;
 wherein, in response to the write transaction, said array controller is configured to store only said subset of said first plurality of data blocks modified by the write transaction and said new parity block as a new parity group to new locations across ones of said plurality of storage devices; and
 wherein said array controller is configured to store a new checksum for each block of said new parity group.

13. The data storage subsystem as recited in claim 12, wherein said array controller is configured to maintain an indirection map comprising an entry for each of said first plurality of data stripe units, wherein each entry is configured to map a virtual address to a physical address and store the checksum for the corresponding data stripe unit, wherein said write transaction specifies the virtual addresses of the subset of said first plurality of data blocks being modified, and wherein said array controller is configured to update said indirection map in response to said write transaction to indicate a new physical address for the new locations of the blocks of said new parity group and to store the new checksum for each block of said new parity group in the indirection map.

14. The data storage subsystem as recited in claim 13, wherein said array controller is further configured to store a second stripe of data as a second plurality of data stripe units across said ones of said plurality of storage devices, wherein said second plurality of data stripe units includes a second plurality of data blocks, which is different in number than said first plurality of data blocks, and a second parity block which is calculated for said second plurality of data blocks, and wherein said array controller is configured to store checksums for each of the second data stripe units in corresponding entries in said indirection map.

15. The data storage subsystem as recited in claim 13, wherein said array controller is further configured to remap a plurality of parity groups by:
 collecting a plurality of existing parity groups each one of which comprises a non-default number of data blocks stored across said storage devices;
 forming a plurality of new parity groups from said plurality of existing parity groups, wherein each one of said plurality of new parity groups comprises a default number of data blocks;
 calculating a plurality of new parity blocks for each one of said new parity groups;
 storing each one of said plurality of new parity groups including said new parity blocks to new locations across ones of said plurality of storage devices; and
 wherein said array controller is configured to store checksums in indirection map entries for each data and parity block of the new parity groups.

16. The data storage subsystem as recited in claim 15, wherein said array controller is further configured to maintain a plurality of versions of said plurality of existing parity groups which existed prior to a modification of ones of said data blocks in said plurality of existing parity groups.

17. The data storage subsystem as recited in claim 13, wherein said array controller is configured to receive a read request for one of said plurality of first data stripe units, wherein said read request specifies a virtual address for the requested data stripe unit, and wherein said array controller is configured to access said indirection map to obtain the physical address and checksum for the requested data stripe unit.

18. The data storage subsystem as recited in claim 12, wherein each one of said plurality of storage devices includes a disk head unit configured for reading and writing data, and wherein said array controller is further configured to select ones of a plurality of new locations closest in proximity to said disk head unit.

19. A method for storing data in a data storage subsystem, comprising:

storing a first stripe of data as a first plurality of data stripe units across a plurality of storage devices;

wherein said first plurality of data stripe units includes a first plurality of data blocks and a first parity block which is calculated for said first plurality of data blocks;

storing entries in an indirection map for each data stripe unit, wherein each entry maps a virtual address to a physical address for one of the data stripe units, and wherein each entry further stores a checksum for the data stripe unit corresponding to that entry;

receiving a write transaction specifying the virtual addresses of a subset of said first plurality of data blocks;

calculating a new parity block for said subset of said first plurality of data blocks;

storing only said subset of said first plurality of data blocks modified by the write transaction and said new parity block as a new parity group to new physical addresses across ones of said plurality of storage devices; and updating the entries in the indirection map for the data blocks modified by the write transaction to indicate the new physical address and checksum for each modified data block.

20. The method as recited in claim 19, further comprising:

storing a second stripe of data as a second plurality of data stripe units across said ones of said plurality of storage devices, wherein said second plurality of data stripe units includes a second plurality of data blocks, which is different in number than said first plurality of data blocks, and a second parity block which is calculated for said second plurality of data blocks; and storing entries in said indirection map for each second data stripe unit, wherein each entry for one of the second data stripe units maps a virtual address to a physical address, and stores a checksum for the second data stripe unit corresponding to that entry.

21. The method as recited in claim 19, further comprising remapping a plurality of parity groups by:

collecting a plurality of existing parity groups each one of which comprises a non-default number of data blocks stored across said storage devices;

forming a plurality of new parity groups from said plurality of existing parity groups, wherein each one of said plurality of new parity groups comprises a default number of data blocks;

calculating a plurality of new parity blocks for each one of said new parity groups; and storing each one of said plurality of new parity groups and said new parity blocks to new physical addresses across ones of said plurality of storage devices.

22. The method as recited in claim 21, further comprising updating the entries in the indirection map for each block of the new parity groups to indicate the new physical address each block.

23. The method as recited in claim 19, further comprising maintaining a plurality of versions of said first plurality of data stripe units which existed prior to a modification of ones of said first plurality of data blocks.

24. The method as recited in claim 23, further comprising storing entries in said indirection map for each of said plurality of versions, wherein each entry for each of said plurality of versions maps a virtual address to a physical address, and stores a checksum for the data stripe unit corresponding to that entry.

25. The method as recited in claim 19, further comprising:

receiving a read request from a host system specifying a virtual address for one of the data stripe units;

accessing said indirection map to obtain the physical address mapped to the specified virtual address and to obtain the checksum for the requested data stripe unit;

obtaining the requested data strip unit at the physical address mapped to the specified virtual address from one of the storage devices;

returning the requested data stripe unit and corresponding checksum to the host system.

26. A method for storing data in a data storage subsystem, comprising:

storing a first plurality of data stripe units across a plurality of storage devices, wherein said first plurality of data stripe units includes a first plurality of data blocks;

storing entries in an indirection map for each data block, wherein each entry maps a virtual address to a physical address for one of the data blocks, and wherein each entry further stores a checksum for the data block corresponding to that entry;

receiving a read request specifying the virtual addresses one of said first plurality of data blocks;

accessing said indirection map to obtain the physical address mapped to the specified virtual address and to obtain the corresponding checksum; and in response to the read request, returning the data block at the physical address mapped to the specified virtual address and returning the corresponding checksum.

27. The method as recited in claim 26, further comprising:

receiving a write transaction specifying a virtual address and a data write for the data block corresponding to the specified virtual address;

performing the data write to a different physical address than currently mapped to the specified virtual address when the write transaction is received;

updating the indirection map entry corresponding to the specified virtual address to indicate the different physical address and a new checksum for the data block modified by the write transaction.

28. The method as recited in claim 26, wherein said first plurality of data blocks is part of a parity group also comprising a first parity block which is calculated for said first plurality of data blocks, the method further comprising:

receiving a write transaction specifying the virtual addresses of a subset of said first plurality of data blocks;

calculating a new parity block for said subset of said first plurality of data blocks;

storing only said subset of said first plurality of data blocks modified by the write transaction and said new parity block as a new parity group to new physical addresses across ones of said plurality of storage devices; and updating the entries in the indirection map for the data blocks modified by the write transaction to indicate the new physical address and checksum for each modified data block.

\* \* \* \* \*